(12) United States Patent
Dinh et al.

(10) Patent No.: US 8,006,493 B2
(45) Date of Patent: Aug. 30, 2011

(54) METHOD AND MACHINE FOR CONVERTING HEAT TO POWER

(76) Inventors: Huy Hai Dinh, Pittsburgh, PA (US); Phi Nguyet Bui, Pittsburgh, PA (US); AnhQuan Hoang Dinh, Pittsburgh, PA (US)

( * ) Notice: Subject to any disclaimer, the term of this patent is extended or adjusted under 35 U.S.C. 154(b) by 466 days.

(21) Appl. No.: 12/288,487

(22) Filed: Oct. 21, 2008

(65) Prior Publication Data
US 2009/0100833 A1    Apr. 23, 2009

(51) Int. Cl.
*F03B 1/02*    (2006.01)
(52) U.S. Cl. .............................. 60/496; 60/495
(58) Field of Classification Search ............. 60/495–507
See application file for complete search history.

(56) References Cited

U.S. PATENT DOCUMENTS

| | | | | |
|---|---|---|---|---|
| 2,513,692 A * | 7/1950 | Tubbs | ............................ | 60/531 |
| 3,916,626 A * | 11/1975 | Schur | ............................ | 60/496 |
| 4,141,218 A * | 2/1979 | Rayboy | ..................... | 60/641.13 |
| 4,196,590 A * | 4/1980 | Fries | ................................ | 60/496 |
| 4,333,311 A * | 6/1982 | Kitabayashi | ................... | 60/496 |

* cited by examiner

*Primary Examiner* — Hoang Nguyen

(57) ABSTRACT

A method is invented for converting heat in a liquid to power and generating thermal difference of the heat source liquid between the inlet and the outlet of a machine. The heat source liquid (8) is drawn to the lower right side of the cylinder (1) through the inlet (5). The heat in the heat source liquid (8) boils the working liquid (2) at the right side of the cylinder (1). The vapor from the boiling creates pressure to push working liquid (2) to the left of the cylinder (1) and to compress the vapor at the left side back to working liquid. The buoyant force on the right and the gravitational force on the left of the cylinder (1) rotate the cylinder (1) to produce power. As heat is transferring to the cylinder (1), the temperature of the heat source liquid (8) is lower at the outlet (4).

1 Claim, 6 Drawing Sheets

METHOD AND MACHINE FOR CONVERTING HEAT TO POWER

FIELD OF THE INVENTION

The present invention relates to a method for converting heat to power.

BACKGROUND

Present day machines usually burn fuel, then transfer the heat from burning to working vapor to create high pressure vapor. Then this high pressure vapor pushes a piston in a cylinder to produce power. After that, the working vapor is dumped to the outside environment. This method of producing power has three big drawbacks. First, it requires fuel which is very expensive to create heat. Second, because it dumps the working vapor after producing power, most of the heat created from burning is lost. Third, because pistons and cylinders have to bear high temperature and pressure, it is expensive to make.

SUMMARY OF THE INVENTION

The present invention overcomes above three drawbacks. First, the invention uses heat from any source such as air, water, and sunlight. Second, the invention recycles the working vapor to preserve the heat in the working vapor. Third, the invention works at considerably low temperature and pressure; hence, it eliminates expensive pistons and cylinders. A heat machine is powered by any kind of heat source liquid. The core part of a heat power machine is a special closed cylinder. As a heat source liquid passes through the lower left side of the cylinder, heat is transferred from the heat source liquid to the working liquid and vapor in the lower left side of the cylinder. As the result, the temperature of the heat source liquid is lowered. As heat is transferred to the working liquid on the left side, the working liquid is boiled to vapor and its vapor pressure is increase. Therefore, the remaining working liquid is pushed to the right side. The high pressure in the working liquid presses the vapor on the right back to working liquid. The buoyant force on the left and the gravitational force on the right make the cylinder rotate counterclockwise to produce power. A heat isolating enclosure ensures that heat is not transferred to or from the right side of the cylinder.

BRIEF DESCRIPTION OF THE DRAWINGS

Figure 1:
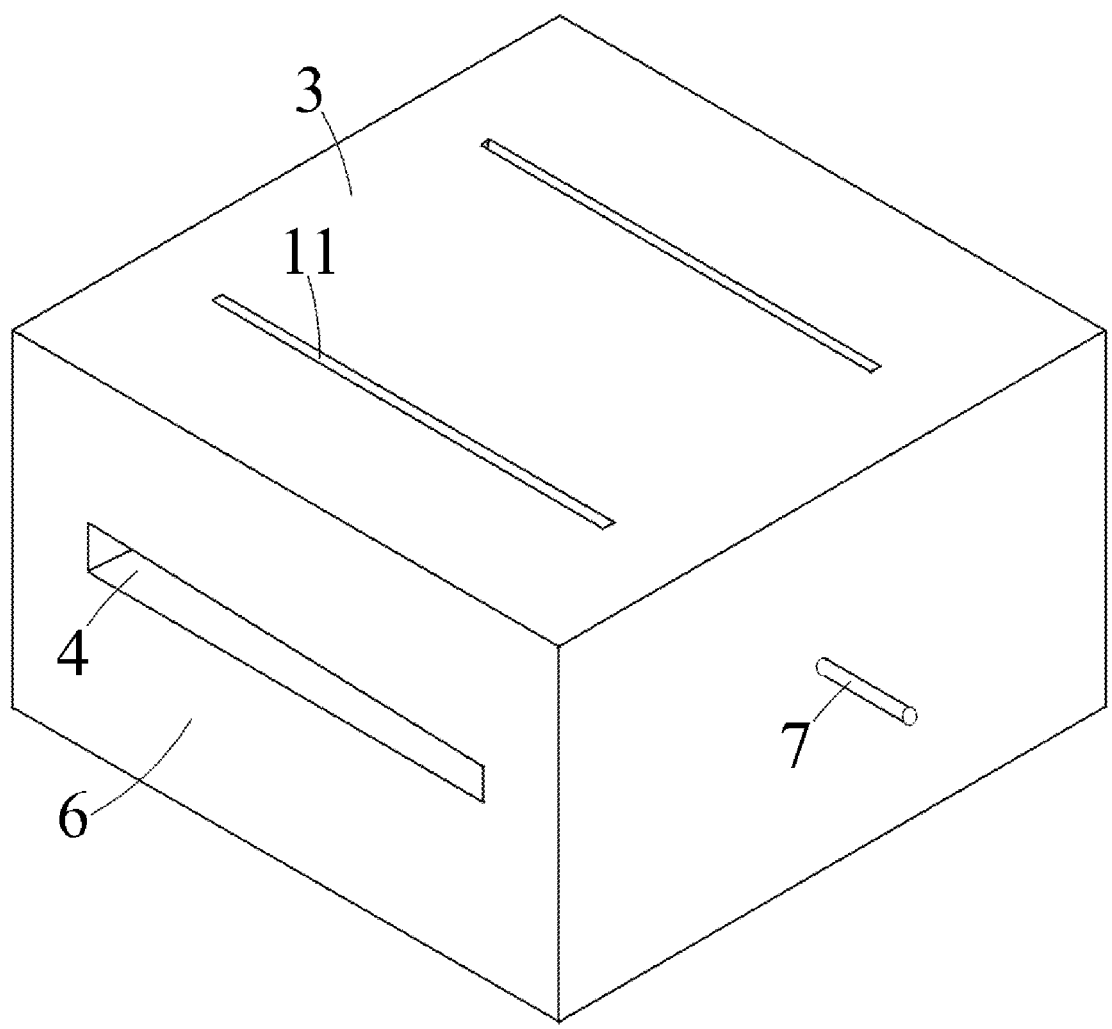
Figure 2:
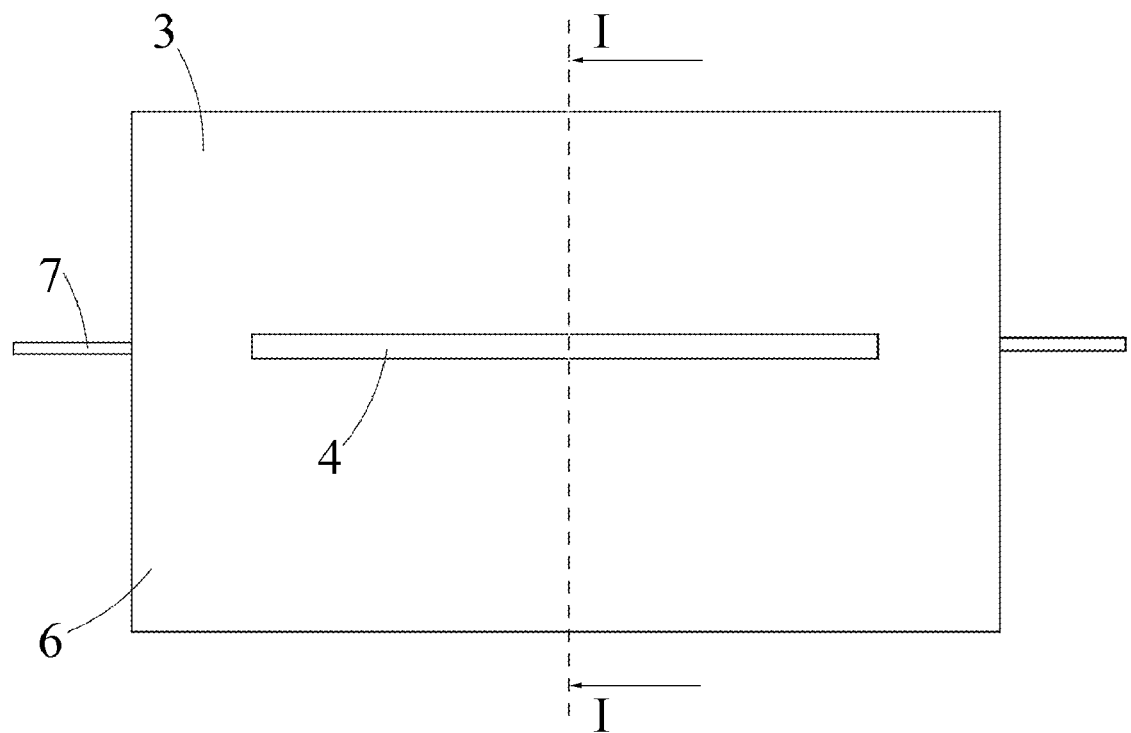
Figure 3:
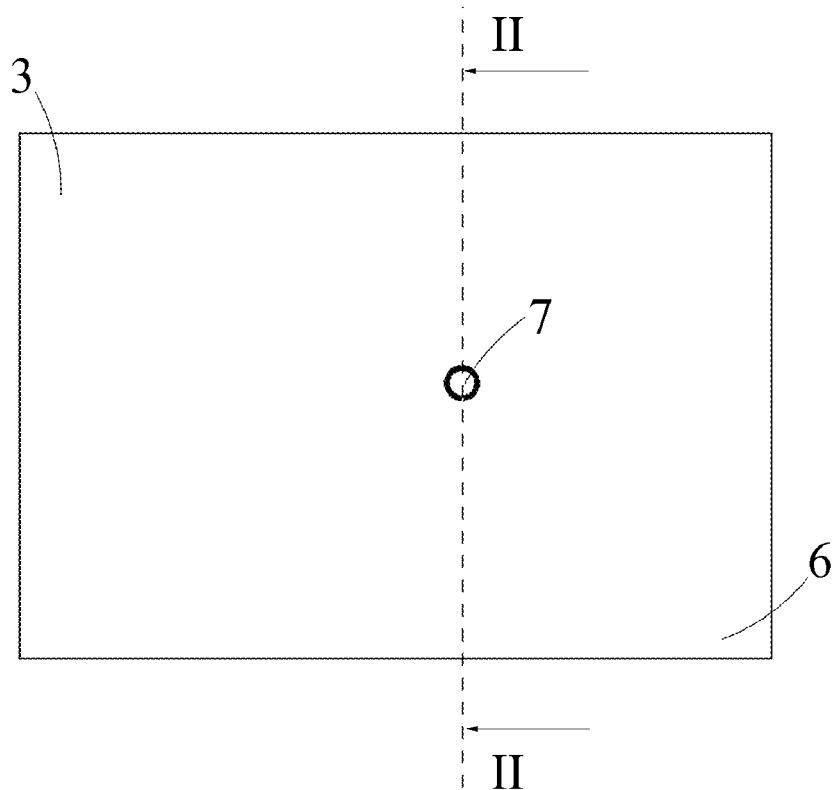
Figure 4:
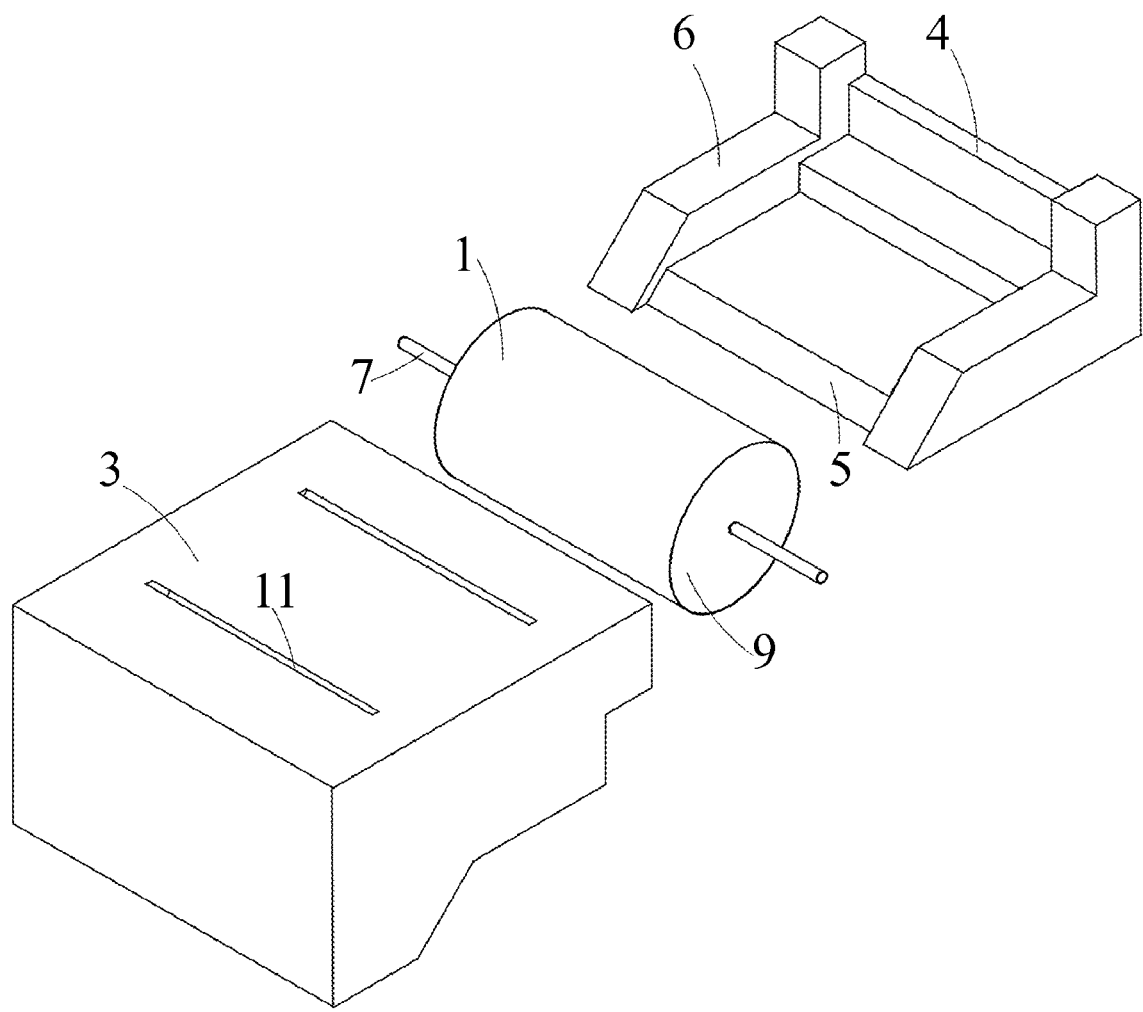
Figure 5:
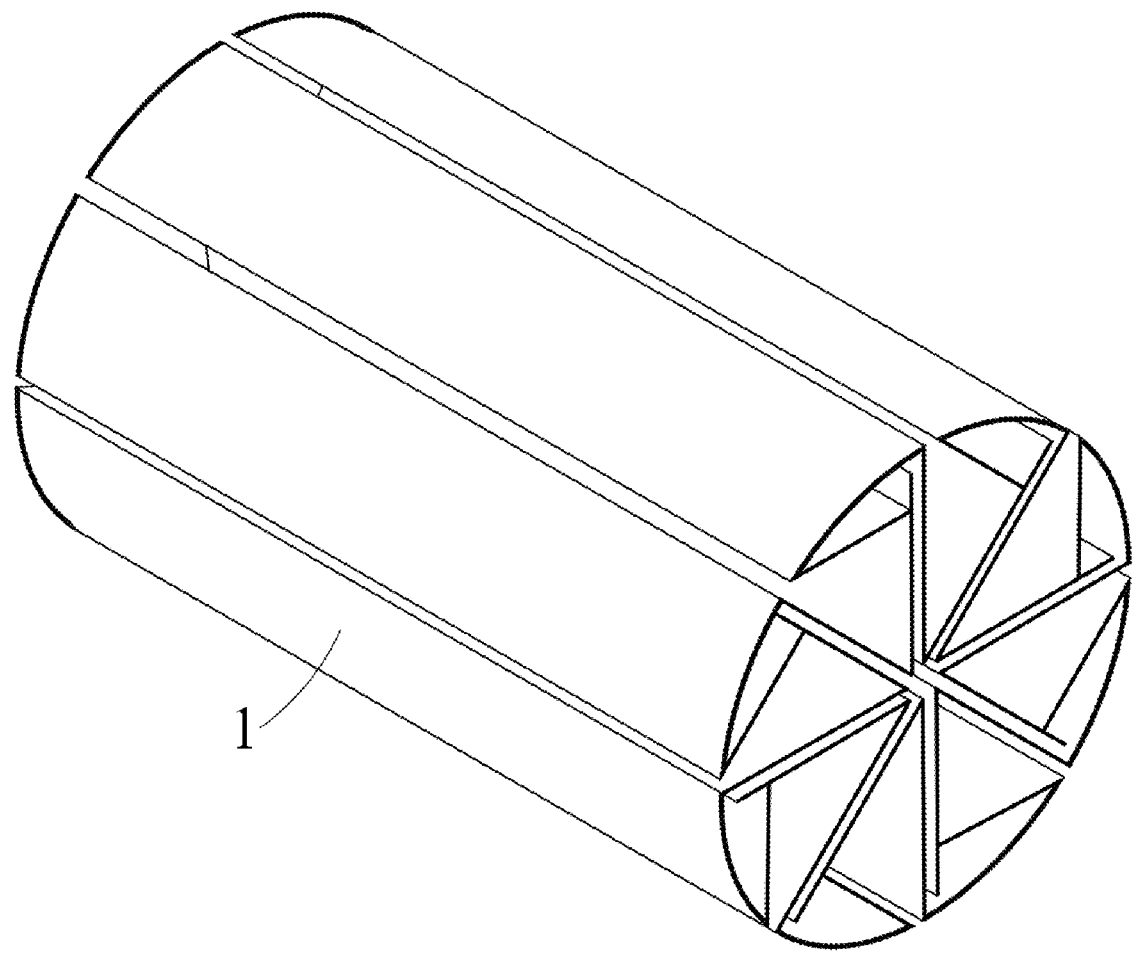

Having thus described the invention in general terms, references will now be made to the accompanying drawings, which are not necessarily drawn to scale, and wherein:

FIG. 1 is the perspective illustration of the invention, illustrating a heat to power machine FIG. 2 is the perspective view of the machine from the front FIG. 3 is the perspective view of the machine from the right FIG. 4 is an exploded, perspective view of the machine FIG. 5 is an exploded, perspective view of the cylinder without its bottom, top, and heat isolating strips.

Figure 6:
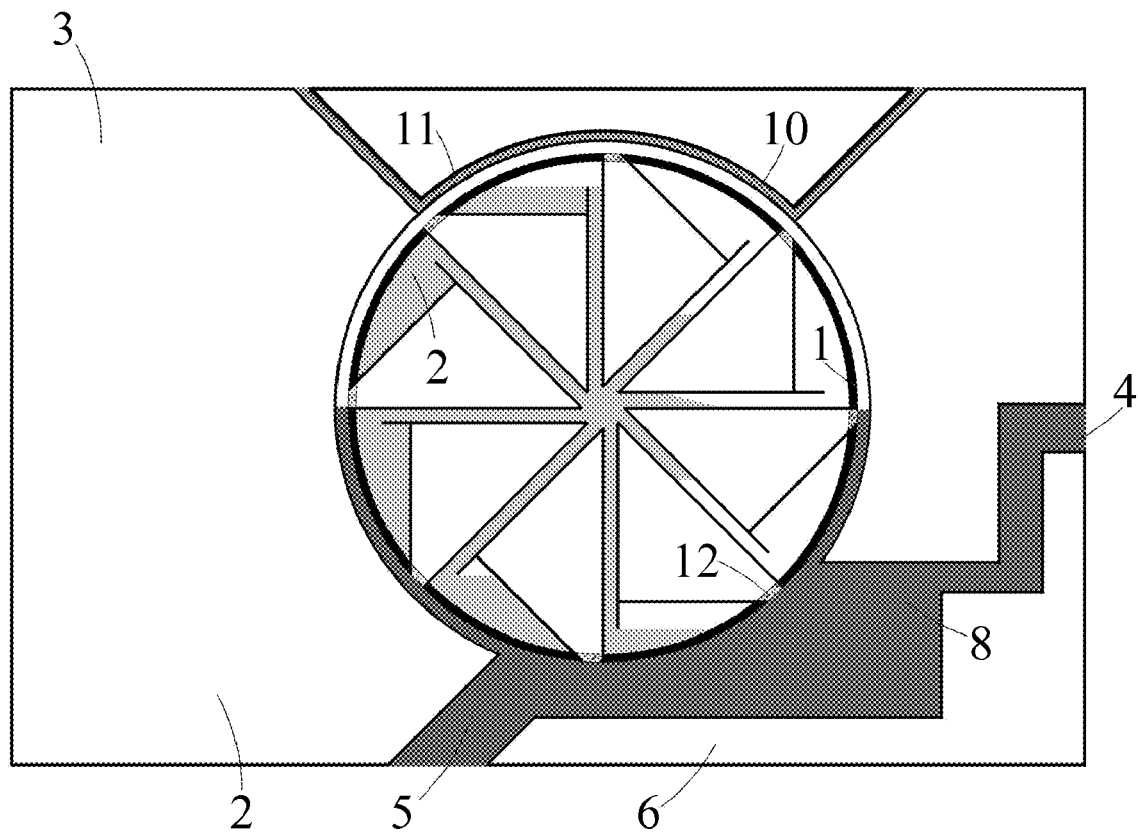

FIG. 6 is a cross sectional view number I of the machine as shown in the FIG. 2

Figure 7:
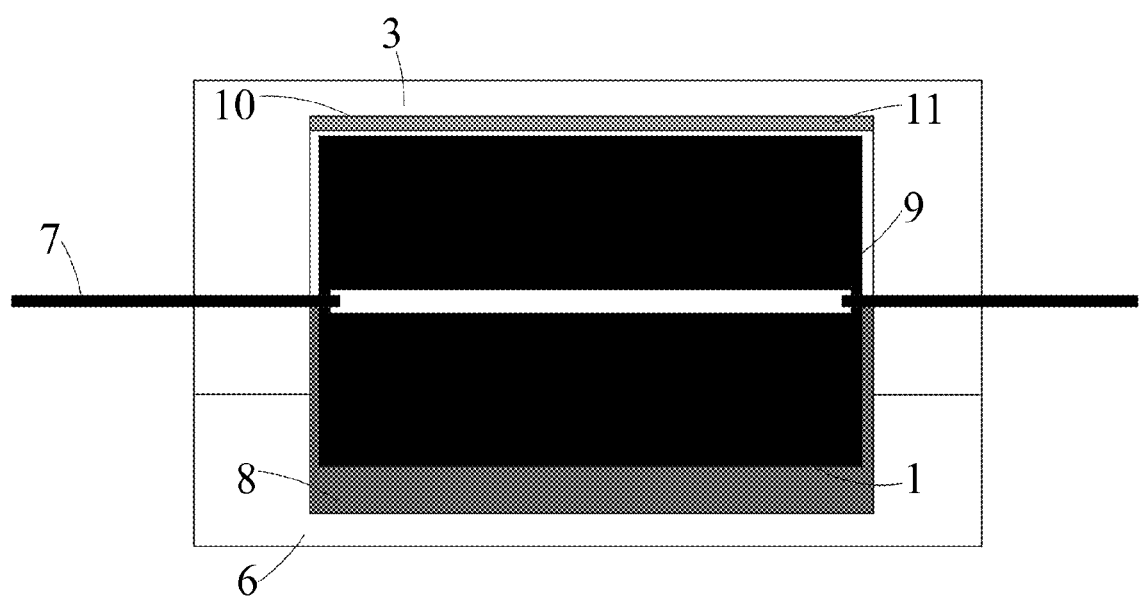

FIG. 7 is a cross sectional view number II of the machine as shown in the FIG. 3

DETAILED DESCRIPTION OF THE INVENTION

The present invention now will be described more fully hereinafter with reference to the accompanying drawings, in which one example of the embodiments of the invention are shown. Indeed, the invention may be embodied in many different forms and should not be construed as limited to the embodiment set forth herein; rather, the embodiment is provided by way of example so that this disclosure will satisfy applicable legal requirements.

FIG. 6 illustrates the cross sectional view of the machine at the middle and perpendicular to the axis of the cylinder (1) as shown in FIG. 2 when the machine is working. A heat power machine is made up of a closed hollow cylinder (1). The side of the cylinder (1) is made of high heat conducting material. The bottom and the top (9) of the cylinder (1) are made of a heat isolating material. The cylinder (1) can rotate around its axis by two shafts (7) that are attached to center of the bottom and the top (9). The side of the cylinder (1) is divided into eight identical strips. These strips are heat isolated from each other by eight identical small heat isolating material strips (12) that are parallel to the axis of the cylinder (1). The cylinder (1) is placed so that its axis is parallel to the ground of the earth. Eight dividers made of heat isolating material are placed inside the cylinder so that the cylinder is divided into eight identical closed L shape wings. In one of the wing there is a valve that can be opened or closed. Four wings are filled with working liquid (2) which has a boiling point lower than the temperature of the heat source liquid (8); the other four wings are filled with the vapor of the working liquid. This can be done by first filling up eight wings with working liquid (2), then pumping out an amount of working liquid (2) that is equal to volume of four wings, then closing the valve. The heat insulated enclosure ensures that heat is transfer to the lower right side of the cylinder only. As heat source liquid (8) is delivered to the right side of the cylinder (1), heat is transferred to the high heat conducting side of the cylinder (1), then transferred to the working liquid (2) and its vapor. As heat is transferred to the working liquid (2) in the lower right side of the cylinder (1), it is boiling. Because of the structure of the wings, most of the vapor from the boiling is trapped on the right side of cylinder. As heat is transferred to the vapor on the right, its pressure is increase. The higher pressure of the vapor on the right side of the cylinder (1) also compress vapor in the upper left side of the cylinder (1) back to working liquid (2). The buoyant force on the right and the gravitational force on the left of the cylinder (1) keeps the cylinder (1) rotating counterclockwise to produce power. As heat is transferred to the cylinder (1), the temperature of the heat source liquid (8) is gradually decreased from bottom to the top. The temperature of the heat source liquid (8) is lower at the outlet (4). When the outside temperature is higher than the boiling point of the working liquid (2), cooling liquid (10) is drawn through the cooler (11) to absorb any heat that is transferred to the upper left side of the cylinder (1) from environment.

FIG. 7 illustrates the cross sectional view of the machine along the axis of the cylinder (1) and perpendicular to the bottom of the machine as shown in FIG. 3. Because the distance between the side of the cylinder (1) and the side of the back enclosure (3) is very small, the amount of heat that is transferred to the left side of the cylinder (1) is minimal. Because the cylinder (1) is submerged in the heat source liquid (8), the gravitation force on its shaft (7) is minimal. The startup force required to rotate the cylinder (1) is also minimized.

Many modifications and other embodiments of the invention set forth herein will come to mind to one skilled in the art to which the invention pertain having the benefit of the teachings presented in the foregoing descriptions and the associated drawings. Therefore, it is to be understood that the invention is not to be limited to the specific example of the embodiment disclosed and that modifications and other embodiments are intended to be included within the scope of the appended claims. Although specific terms are employed herein, they are used in a generic and descriptive sense only and not for purposes of limitation. For example, if the heat source liquid is seawater and the cylinder is attached to a side of a ship, it powers the ship using seawater. If the front enclosure is remove and concentrated sunlight is shined on the lower left side of the cylinder, the machine use sunlight to create power. If the heat source liquid is replaced by air, machine becomes an air conditioner and a power generator.

We claim:

1. A heat engine comprising:

a closed hollow cylinder, which is divided in to eight identical hollow L shape wings by eight identical hollow heat isolating dividers, half filled with working liquid, and placed so that its axis is parallel to the ground of the earth;

a cooler for absorbing any heat transferred to the upper left side of the above cylinder from the outside environment;

a heat isolating enclosure for enclosing the above cylinder, isolating the above cylinder from the heat in the outside environment, and permitting heat source liquid running through the lower right side of the above cylinder for maximizing amount of heat to transfer from heat source liquid to the working liquid and its vapor in the lower right side of the cylinder while minimizing the amount of heat transfer to the left side of the cylinder, the lower right side of the cylinder allows working liquid in the lower right side of the cylinder to boil to vapor and keeps the vapor on the right side;

the cylinder allows the vapor on the right side to have enough pressure before pushing the remaining working liquid to the left side and compress the vapor in the upper left side back to working liquid;

the buoyant and gravitational forces of the cylinder rotate the cylinder to produce power;

an outlet for discharging lower temperature heat source liquid out of the enclosure.

* * * * *